(12) United States Patent
Okai et al.

(10) Patent No.: US 9,991,054 B2
(45) Date of Patent: Jun. 5, 2018

(54) MULTILAYER ELECTRONIC COMPONENT

(71) Applicant: TDK CORPORATION, Tokyo (JP)

(72) Inventors: Keisuke Okai, Tokyo (JP); Hirobumi Tanaka, Tokyo (JP); Yohei Noda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

(21) Appl. No.: 15/265,206

(22) Filed: Sep. 14, 2016

(65) Prior Publication Data

US 2017/0076866 A1 Mar. 16, 2017

(30) Foreign Application Priority Data

Sep. 15, 2015 (JP) ................................. 2015-182060

(51) Int. Cl.
| | |
|---|---|
| *H01G 4/30* | (2006.01) |
| *H01G 4/232* | (2006.01) |
| *H01G 4/008* | (2006.01) |
| *H01G 4/012* | (2006.01) |
| *H01G 4/12* | (2006.01) |

(52) U.S. Cl.
CPC ............. *H01G 4/30* (2013.01); *H01G 4/0085* (2013.01); *H01G 4/012* (2013.01); *H01G 4/232* (2013.01); *H01G 4/1227* (2013.01)

(58) Field of Classification Search
None
See application file for complete search history.

(56) References Cited

U.S. PATENT DOCUMENTS

| | | | |
|---|---|---|---|
| 4,347,650 A | | 9/1982 | McLarney et al. |
| 4,394,456 A | * | 7/1983 | Sakabe ................. C04B 35/462 |
| | | | 501/138 |
| 5,155,072 A | * | 10/1992 | Bruno ................. C04B 35/4682 |
| | | | 501/138 |
| 9,236,188 B1 | * | 1/2016 | Yamada .................... H01G 4/30 |
| 9,384,897 B2 | * | 7/2016 | Kim ......................... H01G 4/30 |
| 2006/0214263 A1 | * | 9/2006 | Kojima .................. H01G 4/012 |
| | | | 257/532 |
| 2007/0254799 A1 | * | 11/2007 | Kaneda ............... C04B 35/4682 |
| | | | 501/139 |

(Continued)

FOREIGN PATENT DOCUMENTS

| | | |
|---|---|---|
| CN | 1392570 A | 1/2003 |
| JP | H02-30570 B2 | 7/1990 |
| JP | H11-340081 A | 12/1999 |

*Primary Examiner* — Dion R Ferguson
(74) *Attorney, Agent, or Firm* — Oliff PLC

(57) ABSTRACT

A multilayer electronic component includes an element body having an internal electrode layer and a dielectric layer. These are substantially parallel to a plane including a first axis and a second axis and are alternately laminated along a third axis direction. Side surfaces oppositely facing in the first axis direction are respectively equipped with an insulating layer. End surfaces facing each other in the second axis direction are respectively equipped with an external electrode. An end portion in the first axis direction of the internal electrode layer is recessed from an end portion in the first axis direction of the dielectric layer to the inner side along the first axis direction. A main component of the internal electrode layer is Ni. A reaction portion is between the end portion in the first axis direction of the internal electrode layer and the insulating layer.

4 Claims, 7 Drawing Sheets

(56) References Cited

U.S. PATENT DOCUMENTS

| | | | |
|---|---|---|---|
| 2008/0304204 A1* | 12/2008 | Suzuki | H01G 4/012 |
| | | | 361/321.3 |
| 2013/0100579 A1* | 4/2013 | Morito | H01G 2/00 |
| | | | 361/321.2 |
| 2014/0211369 A1* | 7/2014 | Sasabayashi | H01G 4/0085 |
| | | | 361/301.4 |
| 2014/0301014 A1* | 10/2014 | Kim | H01G 4/30 |
| | | | 361/301.4 |
| 2016/0351335 A1* | 12/2016 | Kato | H01G 4/30 |
| 2017/0018363 A1* | 1/2017 | Tanaka | H01G 4/232 |

* cited by examiner n – TH LAYER n+1 – TH LAYER

MULTILAYER ELECTRONIC COMPONENT

BACKGROUND OF THE INVENTION

1. Field of the Invention

The present invention relates to a multilayer electronic component.

2. Description of the Related Art

In recent years, a demand for miniaturization of electronic parts associated with the high densification of electronic circuits used in digital electronic devices such as mobile phones has increased, and the miniaturization and capacity enlargement of multilayer electronic components constituting the circuits have been rapidly advanced.

To increase use efficiency of electrode materials, electrostatic capacity, accuracy, or the like, Patent Document 1 proposes a multilayer ceramic capacitor having no structure of side gaps. However, this capacitor has a problem in low voltage endurance, since internal electrodes are exposed to side surfaces of a ceramic sintered body.

As shown in Patent Document 2, a multilayer ceramic electronic component equipped with side gap for increasing insulation withstand voltage is also known. However, adhesiveness between side surfaces of an element body and side gaps composed of synthetic resin or glass is insufficient only by forming synthetic resin, baking glass, or the like on the side surfaces of the element body, as shown in Patent Document 2. Thus, the inventors of the present invention etc. have found out that end portions of internal electrode layers are not sufficiently covered by side gaps, end portions of different internal electrode layers become close, leakage current becomes easy to occur, and variation of resistance value becomes large.

Patent Document 1: Japanese Examined Patent Publication No. 2-30570 A

Patent Document 2: JP 11-340081 A

SUMMARY OF THE INVENTION

The present invention has been made in view of the above circumstances, and an object thereof is to provide a multilayer electronic component having less variation of resistance value.

Means for Solving Problem

In order to achieve the above object, the multilayer electronic component of the present invention is as follows.

[1] A multilayer electronic component comprising an element body having an internal electrode layer and a dielectric layer, both of which are substantially parallel to a plane including a first axis and a second axis and are alternately laminated along a third axis direction, wherein a pair of end surfaces (side surfaces) facing each other in the first axis direction of the element body is respectively equipped with an insulating layer, a pair of end surfaces facing each other in the second axis direction of the element body is respectively equipped with an external electrode electrically connected to the internal electrode layer, an end portion in the first axis direction of the internal electrode layer is recessed at a predetermined retraction distance from an end portion in the first axis direction of the dielectric layer to the inner side along the first axis direction, a main component of the internal electrode layer is Ni, a reaction portion is present between the end portion in the first axis direction of the internal electrode layer and the insulating layer, the reaction portion contains Ti and Zn, an amount of Ti of the reaction portion is 0.1 wt % to less than 20 wt %, and an amount of Zn of the reaction portion is 0.1 wt % to less than 10 wt %.

According to the present invention, variation of resistance value can be small, since the reaction portion containing Ti and Zn at a predetermined amount is present between the internal electrode layer and the insulating layer. Here, "variation of resistance value is small" means "difference in resistance value of every multilayer electronic component is small", that is, "individual difference in resistance of multilayer electronic component".

As a specific aspect of [1] above, the following aspects are exemplified.

[2] The multilayer electronic component according [1], in which the reaction portion further contains one or more kind selected from Mg and Al.

[3] The multilayer electronic component according to [1] or [2], in which the insulating layer contains Ti and Zn and further contains one or more kind selected from Mg and Al.

[4] The multilayer electronic component according to any of [1] to [3], in which $W2a/W0$ is 0.33% to 3.33%, where $W2a$ denotes an average of widths along the first axis of the reaction portions in the element body and $W0$ denotes a width along the first axis of the element body.

[5] A method for manufacturing the multilayer electronic component, the method including a step of obtaining a green laminate by laminating a green sheet having an internal electrode pattern layer that is continuous in a first axis direction and is substantially parallel to a plane including a first axis and a second axis formed in a third axis direction, a step of obtaining a green chip by cutting the green laminate so as to obtain a cutting plane parallel to a plane including a second axis and a third axis, a step of obtaining an element body having an internal electrode layer and a dielectric layer alternately laminated by calcining the green chip, a step of obtaining a ceramic sintered body having an insulating layer formed by coating and baking a paste for insulating layer on an end surface in the first axis direction of the element body, a step of obtaining a multilayer electronic component where an external electrode is formed by baking a paste for external electrode layer on an end surface in the second axis direction of the ceramic sintered body, in which an end portion in the first axis direction of the internal electrode layer is recessed at a predetermined retraction distance from an end portion in the first axis direction of the dielectric layer to the inner side along the first axis direction, a main component of the internal electrode layer is Ni, a reaction portion is present between the end portion in the first axis direction of the internal electrode layer and the insulating layer, the reaction portion contains Ti and Zn, an amount of Ti of the reaction portion is 0.1 wt % to less than 20 wt %, and an amount of Zn of the reaction portion is 0.1 wt % to less than 10 wt %.

BRIEF DESCRIPTION OF THE DRAWINGS

FIG. 5Ab is a plan view illustrating a portion of the n+1-th internal electrode pattern layer.

DESCRIPTION OF THE PREFERRED EMBODIMENTS

Figure 1:
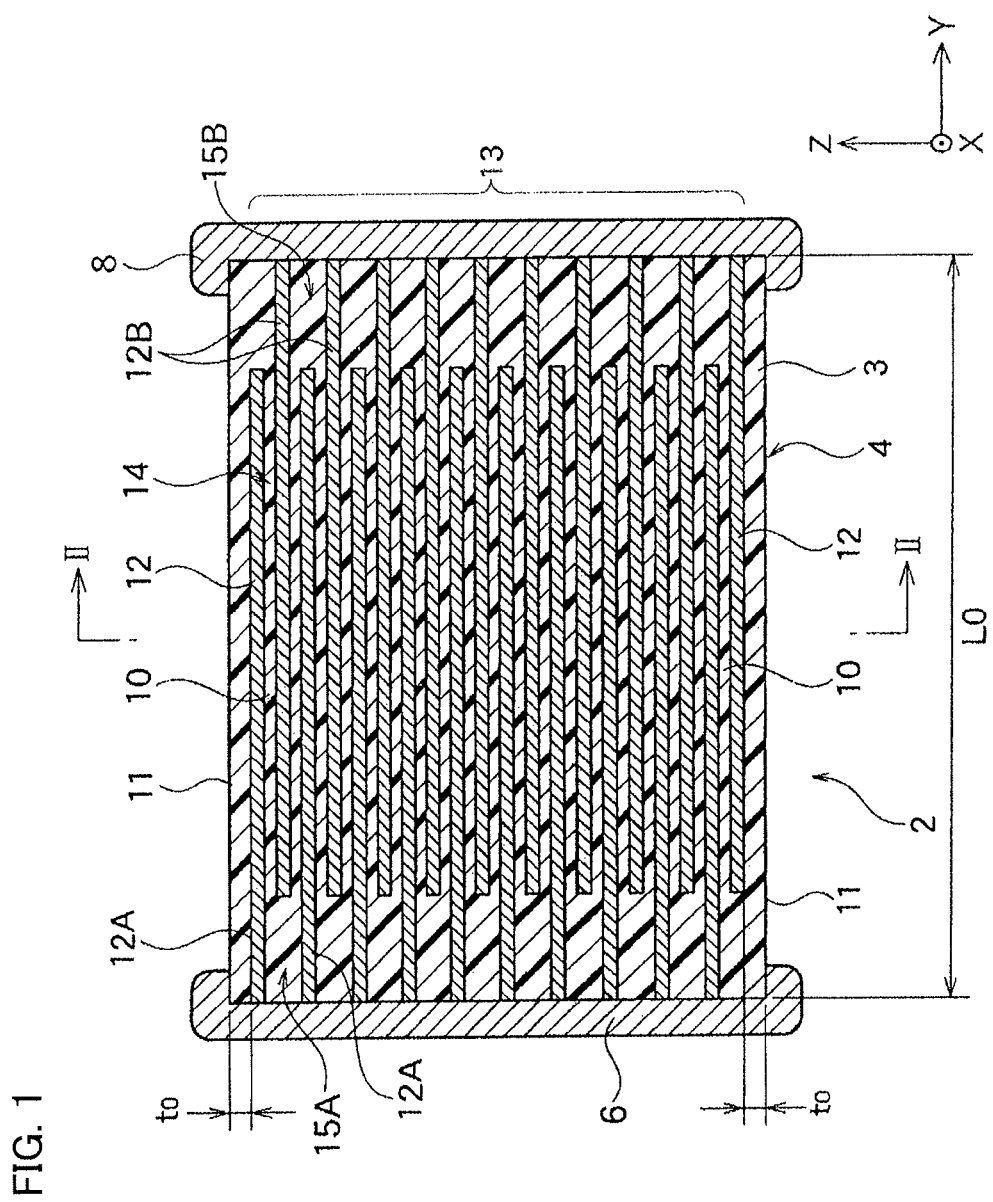
FIG. 1 is a schematic cross-sectional view of the multilayer ceramic capacitor according to an embodiment of the present invention.

The present invention will be described in detail based on the present embodiment with reference to the drawings, but the present invention is not limited to the embodiment to be described below.

In addition, the constituents to be described below include those that can be easily presumed by those skilled in the art and those that are substantially the same with one another. Furthermore, the constituents to be described below can be appropriately combined with one another.

Hereinafter, the present invention will be described based on the embodiment illustrated in the drawings.

Overall Configuration of Multilayer Ceramic Capacitor

As an embodiment of the laminated electronic component according to the present embodiment, the overall configuration of a multilayer ceramic capacitor will be described.

Figure 2:
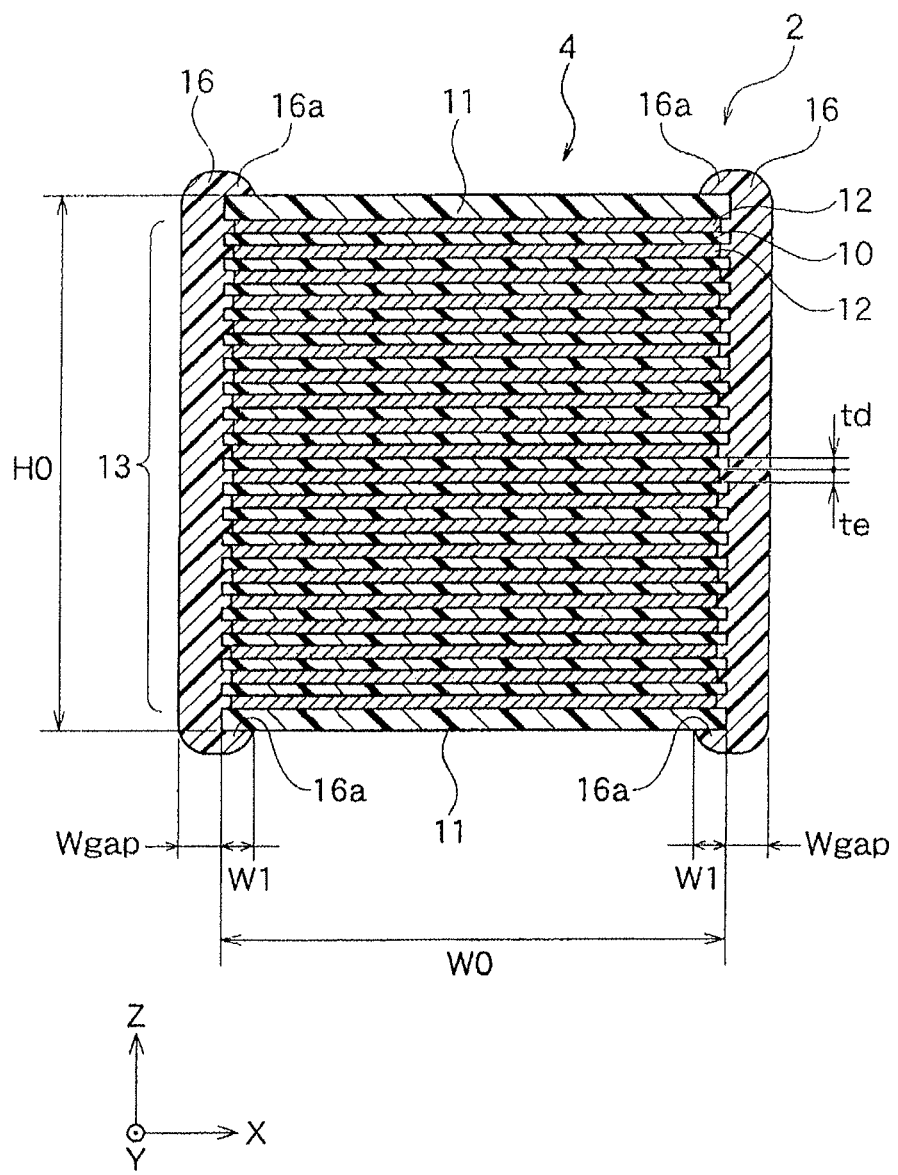
FIG. 2 is a cross-sectional view taken along the line II-II illustrated in FIG. 1.

As illustrated in FIG. 1, a multilayer ceramic capacitor 2 according to the present embodiment includes a ceramic sintered body 4, a first external electrode 6, and a second external electrode 8. In addition, as illustrated in FIG. 2, the ceramic sintered body 4 has an element body 3 and an insulating layer 16.

The element body 3 has an inner dielectric layer 10 and an internal electrode layer 12 which are substantially parallel to a plane including an X-axis and a Y-axis, and the internal electrode layer 12 is alternately laminated between the inner dielectric layers 10 along a Z-axis direction. Here, the term "substantially parallel" means that the most part is parallel but there may be a part that is not parallel, and it intends that the internal electrode layer 12 and the inner dielectric layer 10 may be a little irregular or tilted.

The portion at which the inner dielectric layer 10 and the internal electrode layer 12 are alternately laminated is an interior region 13.

In addition, the element body 3 has an exterior region 11 on both end surfaces in the laminating direction Z (Z-axis) thereof. The exterior region 11 is formed by laminating a plurality of outer dielectric layers that are thicker than the inner dielectric layer 10 constituting the interior region 13.

Incidentally, hereinafter, the "inner dielectric layer 10" and the "outer dielectric layer" are collectively referred to as the "dielectric layer" in some cases.

The material for the inner dielectric layer 10 and the dielectric layer constituting the exterior region 11 may be the same as or different from each other, and it is not particularly limited, and for example, they may be constituted to contain a dielectric material having a perovskite structure such as $ABO_3$ or an alkali niobate-based ceramic as a main component.

In $ABO_3$, for example, A is at least one kind such as Ca, Ba, or Sr, and B is at least one kind such as Ti or Zr. The molar ratio of A/B is not particularly limited, and it is from 0.980 to 1.020.

In addition to this, examples of an accessory component may include silicon dioxide, aluminum oxide, magnesium oxide, alkali metal compound, alkaline earth metal compound, manganese oxide, a rare earth element oxide, and vanadium oxide, but it is not limited to these. The content thereof may also be appropriately determined in accordance with the composition and the like.

Incidentally, it is possible to lower the calcination temperature by using silicon dioxide and aluminum oxide as the accessory component. In addition, the lifespan can be improved by using magnesium oxide, alkali metal compound, alkaline earth metal compound, manganese oxide, rare earth element oxide, and vanadium oxide as the accessory component.

The number of lamination of the inner dielectric layer 10 and the outer dielectric layer of the present embodiment may be appropriately determined in accordance with the application and the like.

One internal electrode layer 12 to be alternately laminated has a lead portion 12A that is electrically connected to the inner side of a first external electrode 6 formed on the outer side of a first end portion in a Y-axis direction of the ceramic sintered body 4. In addition, the other internal electrode layer 12 has a lead portion 12B that is electrically connected to the inner side of a second external electrode 8 formed on the outer side of a second end portion in a Y-axis direction of the ceramic sintered body 4.

The interior region 13 has a capacity region 14 and lead regions 15A and 15B. The capacity region 14 is a region in which the internal electrode layer 12 is laminated along the laminating direction so as to sandwich the inner dielectric layer 10. The lead region 15A is a region located between the lead portions 12A of the internal electrode layers 12 to be connected to the external electrodes 6. The lead region 15B is a region located between the lead portions 12B of the internal electrode layers 12 to be connected to the external electrodes 8.

A main component of a conductive material contained in the internal electrode layers 12 is Ni, but the conductive material may contain a component constituting the dielectric layer or so as accessory component. The internal electrode layer 12 may be formed by using a commercially available electrode paste, and the thickness of the internal electrode layer 12 may be appropriately determined in accordance with the application and the like.

As illustrated in FIG. 2, the both end surfaces in the X-axis direction of the ceramic sintered body 4 are equipped with the insulating layers 16 covering the end surfaces of the internal electrode layers 12 of the element body 3.

In the present embodiment, the end portion in the X-axis direction of the internal electrode layer 12 sandwiched between the inner dielectric layers 10 adjacent in the laminating direction (Z-axis direction) is recessed on the end surface in the X-axis direction of the element body 3, namely, at the predetermined retraction distance from the X-axis direction end portion to the inner side of the inner dielectric layer 10.

The retraction of the X-axis direction end portion of the internal electrode layer 12 is formed, for example, by the difference in sintering shrinkage factor between the material to form the internal electrode layer 12 and the material to form the inner dielectric layer 10. The retraction distance of the end portion in the X-axis direction of the internal electrode layer 12 can be also adjusted by polishing, such as barrel polishing, the end surfaces in the X-axis direction of the element body 3 before forming the insulating layer 16.

Figure 3:
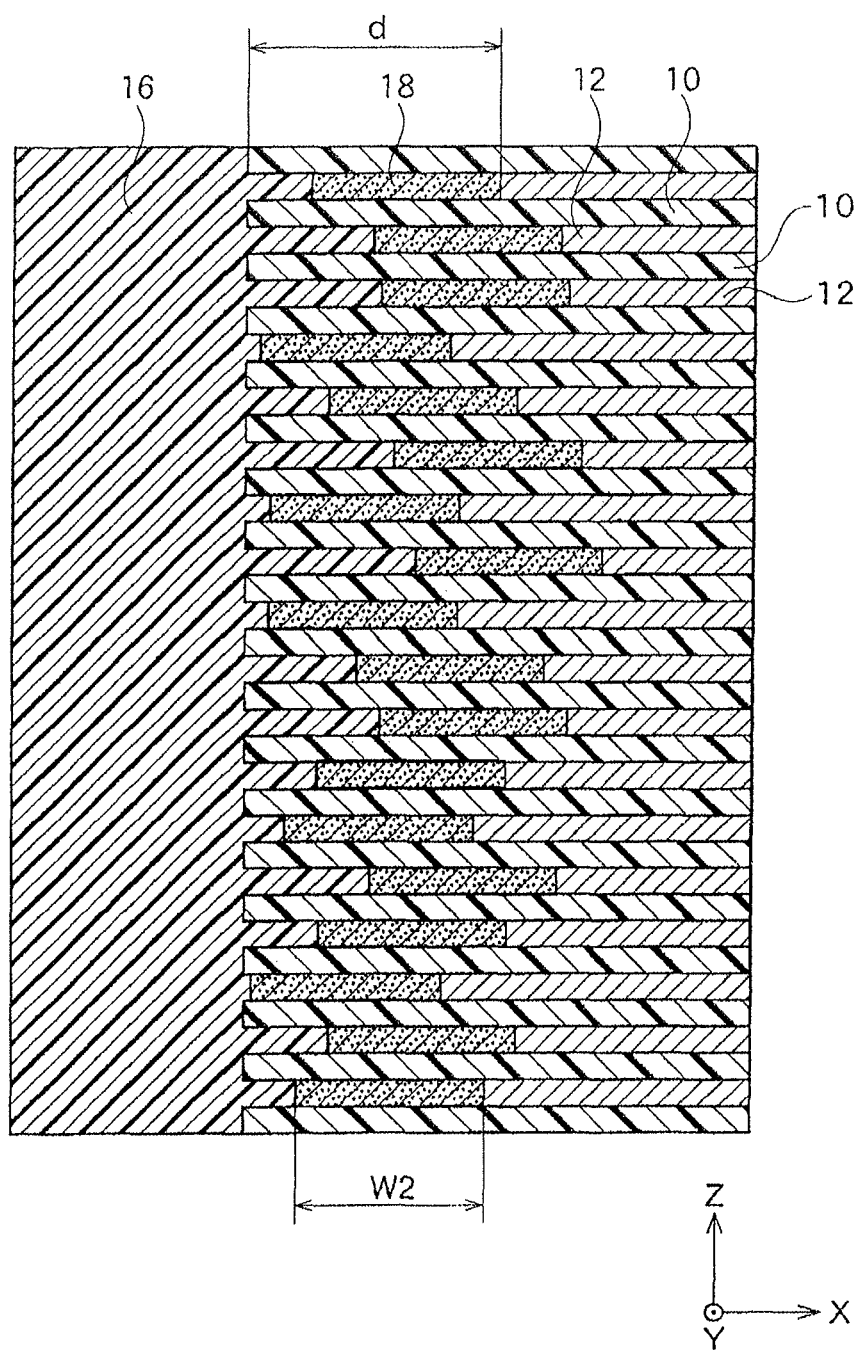
FIG. 3 is an enlarged fragmentary view of FIG. 2.

In the present embodiment, as shown in FIG. 3, reaction portions 18 containing Ti and Zn at a predetermined amount are present between the end portions in the X-axis direction of the internal electrode layers 12 and the insulating layer 16. The reaction portion 18 is where compound of Ni, Ti, and Zn is uniformly formed in a film state and has insulation effect.

In the present embodiment, the reaction portions 18 are present between the end portions in the X-axis direction of the internal electrode layers 12 and the insulating layer 16, which leads to a state where the end portions in the X-axis direction of the internal electrode layers 12 are sufficiently insulated, and improves adhesive properties between the end portions in the X-axis direction of the internal electrode layers 12 and the inner dielectric layer 10. Thus, generation of leakage current can be prevented, and variation of resistance value can be small.

Incidentally, the reaction portions 18 are preferably present at all of the end portions in the X-axis direction of the internal electrode layers 12 of the present embodiment, but may not be present at some of the end portions in the X-axis direction of the internal electrode layers 12.

The amount of Ti of the reaction portion 18 is 0.1 wt % to less than 20 wt %. This makes it possible to form a compound with Ni. Thus, insulation effect can be demonstrated, and variation of resistance value can be small.

The amount of Zn of the reaction portion is 0.1 wt % to less than 10 wt %. This makes it possible to form a compound with Ni. Thus, insulation effect can be demonstrated, and variation of resistance value can be small.

In addition to Ti and Zn, the reaction portion 18 preferably contains one or more kind selected from Mg and Al. This makes it possible to not only reduce variation of resistance value, but to have a favorable insulation breakdown voltage defective rate.

Ni contained in the internal electrode layers 12 and Zn, Mg, Al, and Ti contained in the insulating layer 16 are elements whose ion radius is extremely similar to each other. Thus, the reaction between the internal electrode layers 12 containing Ni and the insulating layer 16 is accelerated, and a uniform reaction portion 18 is easy to be formed. As a result, it is considered that the end portions in the X-axis direction of the internal electrode layers 12 are more sufficiently insulated, adhesiveness between the end portions of the internal electrode layers 12 and the inner dielectric layer 10 is improved, variation of resistance value becomes small, and insulation breakdown voltage defective rate becomes favorable.

The insulating layers 16 according to the present embodiment cover both end surfaces (side surfaces) in the X-axis direction of the element body 3. It is preferable that the insulating layers 16 according to the present embodiment integrally have insulating layer extension portions 16a covering both ends in the X-axis direction of the end surfaces in the Z-axis direction of the element body 3 and/or both end portions in the X-axis direction on the end surfaces in the Y-axis direction of the element body 3. Both ends in the Z-axis direction of the external electrodes 6 and 8 cover both ends in the Y-axis direction of the insulating layer extension portions 16a.

In the present embodiment, both ends in the X-axis direction of the external electrodes 6 and 8 shown in FIG. 1 do not cover both ends in the Y-axis direction of the insulating layers 16 shown in FIG. 2 from both sides in the X-axis direction, but may cover them.

The softening point of the insulating layer 16 is preferably 500° C. to 1000° C. This makes it possible to reduce influence of structural defect that can be generated in the before and after the step.

It is preferable that the insulating layer 16 according to the present embodiment contains Ti and Zn, and further contains one or more kind selected from Mg and Al. This makes it possible to easily form the uniform reaction portions 18 at the end portion in the X-axis direction of the internal electrode layers 12.

It is considered that this is because since Ni contained in the internal electrode layers 12 and Zn, Mg, Al, and Ti contained in the insulating layer 16 are elements whose ion radius is extremely similar to each other, Ni contained in the internal electrode layers 12 and Zn, Mg, Al, and Ti contained in paste for insulating layer are easily reacted at the time of baking the paste for insulating layer to be the insulating layer 16 after baking to the element body 3.

It is considered that this more sufficiently insulates the end portions in the X-axis direction of the internal electrode layers 12 and improves adhesiveness between the end portions of the internal electrode layers 12 and the inner dielectric layer 10, and thus can reduce variation of resistance value and form a favorable insulation breakdown voltage defective rate.

Incidentally, the insulating layer 16 may contain an element, such as Ba, Si, Ca, La, and Bi, in addition to the above elements, and may contain glass component or ceramic component.

For acknowledgement of the reaction portion 18, for example, a cross section for observation near an interface of the inner electrode layer 12 and the insulating layer 16 of the ceramic sintered body 4 is obtained to be observed by optical mode of a digital microscope, and a portion having lower lightness can be acknowledged as the reaction portion 18. Also, a portion having higher lightness can be acknowledged as the inner electrode layer 12 containing Ni by observation in the same method. Furthermore, a portion having no lightness can be acknowledged as the insulating layer 16 by observation in the same method.

By covering the end surface in the X-axis direction of the element body 3 with the insulating layer 16, not only the insulating properties are enhanced but also the durability and moisture resistance to the environmental impact from the outside are enhanced. Also, the insulating layer 16 covers the end surface in the X-axis direction of the fired ceramic sintered body 4, and thus a uniform insulating layer 16 having a gap portion (side gap) whose width is small can be formed.

The material of the external electrodes 6 and 8 is not limited either, but a well-known conductive material, such as at least one kind of Ni, Pd, Ag, Au, Cu, Pt, Rh, Ru, Jr etc., alloy thereof, and conductive resin, can be used. The thickness of the external electrodes 6 and 8 may be appropriately determined in accordance with the application and the like.

Incidentally, in FIG. 1, the X-axis, the Y-axis, and the Z-axis are perpendicular to one another, the Z-axis coincides with the laminating direction of the inner dielectric layer 10 and the internal electrode layer 12, the Y-axis coincides with the direction in which the lead regions 15A and 15B (lead portions 12A and 12B) are formed.

In the present embodiment, as illustrated in FIG. 2, the section from the end surface in the X-axis direction of the element body 3 to the outer surface of the insulating layer 16 along the width direction (X-axis direction) of the ceramic sintered body 4 in the insulating layer 16 is adopted as the gap portion.

In the present embodiment, the width Wgap in the X-axis direction of the gap portion coincides with the dimensions from the end surface in the X-axis direction of the element body 3 to the end surface in the X-axis direction of the insulating layer 16 along the width direction (X-axis direction) of the ceramic sintered body 4, but the width Wgap is not necessarily uniform along the Z-axis direction but may be a bit varied. The average of the width Wgap is preferably from 0.1 µm to 40 µm, which is extremely smaller than the width W0 of the element body 3.

In the present embodiment, it is possible to significantly decrease the width Wgap as compared to the prior art, moreover, the retraction distance of the internal electrode layer 12 is sufficiently small. Hence, in the present embodiment, it is possible to obtain a multilayer capacitor having a great capacity while being compact.

Incidentally, the width W0 of the element body 3 coincides with the width along the X-axis direction of the inner dielectric layer 10.

By setting Wgap to be within the above range, a decrease in electrostatic capacity is small even when the ceramic sintered body 4 is more compact as well as cracking hardly occurs.

In the present embodiment, as illustrated in FIG. 2, the insulating layer extension portions 16a covering both ends in the X-axis direction on both end surfaces in the Z-axis direction of the element body 3 are integrally formed with the insulating layers 16 at both ends in the Z-axis direction of the insulating layers 16. $1/30 \leq W1/W0 < 1/2$ is preferably satisfied, where W1 and W0 are respectively a width in the X-axis direction of the insulating layer extension portions 16a from both end surfaces in the X-axis direction of the element body 3.

In the present embodiment, as mentioned above, the end portion in the X-axis direction of the internal electrode layer 12 sandwiched between the inner dielectric layers 10 adjacent in the laminating direction (Z-axis direction) is recessed on the end surface in the X-axis direction of the element body 3, namely, as shown in FIG. 3, at the predetermined retraction distance "d" from the X-axis direction end portion to the inner side along the X-axis direction of the inner dielectric layer 10.

Here, as shown in FIG. 3, the retraction distance "d" means a distance from the end portion in the X-axis direction of the inner dielectric layer 10 to the end portion in the X-axis direction of the internal electrode layer 12. When the reaction portion 18 or a nonconductive portion mentioned below is present between the end portion in the X-axis direction of the internal electrode layer 12 and the insulation layer 16, the retraction distance "d" also means a distance from the end portion in the X-axis direction of the inner dielectric layer 10 to the end portion in the X-axis direction of the internal electrode layer 12.

Incidentally, the end portion of the inner dielectric layer 10 and the internal electrode layer 12 may have irregularities, and in this case, an outermost portion of the inner dielectric layer 10 and the internal electrode layer 12 is standard. That is, at the end portion in the X-axis direction of the inner dielectric layer 10, the retraction distance "d" means a distance from an outermost portion in the X-axis direction of the inner dielectric layer 10 to an outermost portion in the X-axis direction of the internal electrode layer 12.

In the present embodiment, not all of the internal electrode layers 12 need to be recessed inside at a predetermined range, and some of the internal electrode layers 12 may be exposed on the end surface in the X-axis direction of the element body 3.

Incidentally, the retraction distance "d" is preferably varied at every layer of the internal electrode layers 12. This can prevent decrease in insulation resistance even if the internal electrode layers 12 is thinly layered.

In FIG. 3, the reaction portions 18 are formed at the end portions in the X-axis direction of each internal electrode layer 12 within the range of a predetermined width W2 from the end portions in the X-axis direction of the internal electrode layers 12. Incidentally, the end portions of the reaction portions 18 may have irregularities, and the width W2 is a portion having largest width of one reaction portion 18.

In FIG. 3, the reaction portions 18 are formed inside the inner dielectric layers 10, but the reaction portions 18 may be formed near the end portions of the inner dielectric layers 10, and some of the reaction portions 18 may protrude outside the inner dielectric layers 10.

The width W2 of the reaction portions 18 is almost constant at every internal electrode layer 12, but may be varied.

W2a/W0 is preferably 0.33% to 3.33%, where W2a denotes an average of the width W2 of the reaction portions 18 in the element body 3. This improves adhesion between both end portions of the internal electrode layers 12 and the insulating layers 16. Thus, insulation withstand voltage becomes favorable, and electrostatic capacity can be enhanced.

The reaction portion 18 according to the present embodiment can be obtained by applying a predetermined paste for insulating layer to the end portions in the X-axis direction of the element body 3 and baking them under a predetermined condition. The width W2 of the reaction portions 18 can be controlled by changing retention temperature, retention time, and the like at the time of applying the predetermined paste for insulating layer to the end portions in the X-axis direction of the element body 3 and baking them.

In the present embodiment, a nonconductive portion is preferably present between the end portion in the X-axis direction of the internal electrode layer 12 and the insulating layer 16 or between the end portion in the X-axis direction of the internal electrode layer 12 and the reaction portion 18. This can sufficiently prevent different internal electrode layers 12 from contacting with each other and have a sufficient distance between the internal electrode layers 12 at different layers at both end portions in the X-axis direction of the internal electrode layer 12. This makes it possible to reduce a short circuit defective rate at the time of thinning the inner dielectric layers 10, prevent generation of leakage current, and prevent variation of resistance value. Also, the presence of the nonconductive portion further improves adhesion between the internal electrode layer 12 and the insulating layer 16, and improves mechanical strength endurable to pressure from outside by handling or so.

The nonconductive portion according to the present embodiment can be obtained by performing oxidation treatment, nitriding treatment, alloying treatment due to sputtering, or the like against the end portion of the internal electrode layer 12 of the element body 3 after annealing.

Even if the nonconductive portion is present at the end portion of the internal electrode layer 12, the reaction portion 18 is formed by baking paste for insulating layer to be the insulating layer 16 after baking to the element body 3 so as to react Ni contained in the nonconductive portion or the internal electrode layer 12 and Zn contained in the paste for insulating layer.

After baking the paste for insulating layer to the element body 3 where the nonconductive layer is present at the end portion of the internal electrode layer 12, part of the nonconductive portion may become part of the reaction portion 18, all of the nonconductive layer may become part of the reaction portion 18, or part of the nonconductive portion and the internal electrode layer 12 may become part of the reaction portion 18.

A width Wgap at both sides in the X-axis direction of the ceramic sintered body 4, the width W1, an average "da" of the retraction distance d, and an average W2a of the width W2 may be respectively the same or different.

It is preferable that the insulating layer 16 does not widely cover the both end surfaces in the Y-axis direction of the element body 3 illustrated in FIG. 1. This is because it is required that the external electrodes 6 and 8 are formed on the both end surfaces in the Y-axis direction of the element body 3 and connected to the internal electrode layers 12. The external electrodes 6 and 8 according to the present embodiment may cover the insulating layer extension portions 16a.

The thickness "td" of the inner dielectric layers 10 is not particularly limited, but is preferably 0.1 µm to 5.0 µm.

The thickness "te" of the internal electrode layer 12 is not particularly limited, but is preferably 0.1 µm to 5.0 µm.

The thickness "to" of the exterior region 11 is not particularly limited, but is preferably 0.1 µm to 5.0 µm.

Method for Manufacturing Multilayer Ceramic Capacitor

Next, a method for manufacturing the multilayer ceramic capacitor 2 as an embodiment of the present invention will be specifically described. The multilayer ceramic capacitor 2 is manufactured by making green chips with an ordinary printing method, sheet method, or the like using paste, firing this, applying paste for insulating layer thereto using a method of dipping, performing baking, and performing baking after printing or transcripting the external electrodes 6 and 8.

First, a paste for inner green sheet and a paste for outer green sheet are prepared in order to manufacture an inner green sheet 10a to constitute the inner dielectric layer 10 illustrated in FIG. 1 after calcination and an outer green sheet 11a to constitute the outer dielectric layer illustrated in FIG. 1 after calcination.

The paste for inner green sheet and the paste for outer green sheet are usually composed of an organic solvent-based paste obtained by kneading a ceramic powder with an organic vehicle or an aqueous paste.

The raw material for the ceramic powder can be appropriately selected from various kinds of compounds to be composite oxides or oxides, for example, carbonates, nitrates, hydroxides, and organic metal compounds are used by being mixed. In the present embodiment, the raw material for the ceramic powder is used as a powder having an average particle size of 0.45 µm or less and preferably about from 0.1 to 0.3 µm. Incidentally, it is desirable to use a powder finer than the thickness of the green sheet in order to obtain a significantly thin inner green sheet.

The organic vehicle is one that is obtained by dissolving a binder in an organic solvent. The binder used in the organic vehicle is not particularly limited, and it may be appropriately selected from various kinds of common binders such as ethyl cellulose and polyvinyl butyral. The organic solvent to be used is also not particularly limited, and it may be appropriately selected from various kinds of organic solvents such as an alcohol, acetone, and toluene.

In addition, the paste for green sheet may contain additives selected from various kinds of dispersants, plasticizers, dielectrics, accessory component compounds, glass frits, and insulating materials.

Examples of the plasticizer may include an ester of phthalic acid such as dibutyl phthalate, dioctyl phthalate or benzyl butyl phthalate, adipic acid, an ester of phosphoric acid, and a glycol.

Next, a paste for internal electrode layer is prepared in order to manufacture an internal electrode pattern layer 12a to constitute the internal electrode layers 12A and 12B illustrated in FIG. 1 after calcination. The paste for internal electrode layer is prepared by kneading a conductive material composed of various kinds of conductive metals or alloys described above with the organic vehicle described above.

When using Ni as the conductive material, Ni powder prepared by using a commercially available CVD method, wet chemical reduction method, or the like may be used.

In the present embodiment, first, the paste for internal electrode layer is prepared by kneading a conductive material composed of various kinds of conductive metals or alloys described above with the organic vehicle described above.

Next, the inner green sheet 10a is formed on a carrier sheet (for example, a PET film) as a support by a doctor blade method. The inner green sheet 10a is dried after being formed on the carrier sheet.

Figure 4:
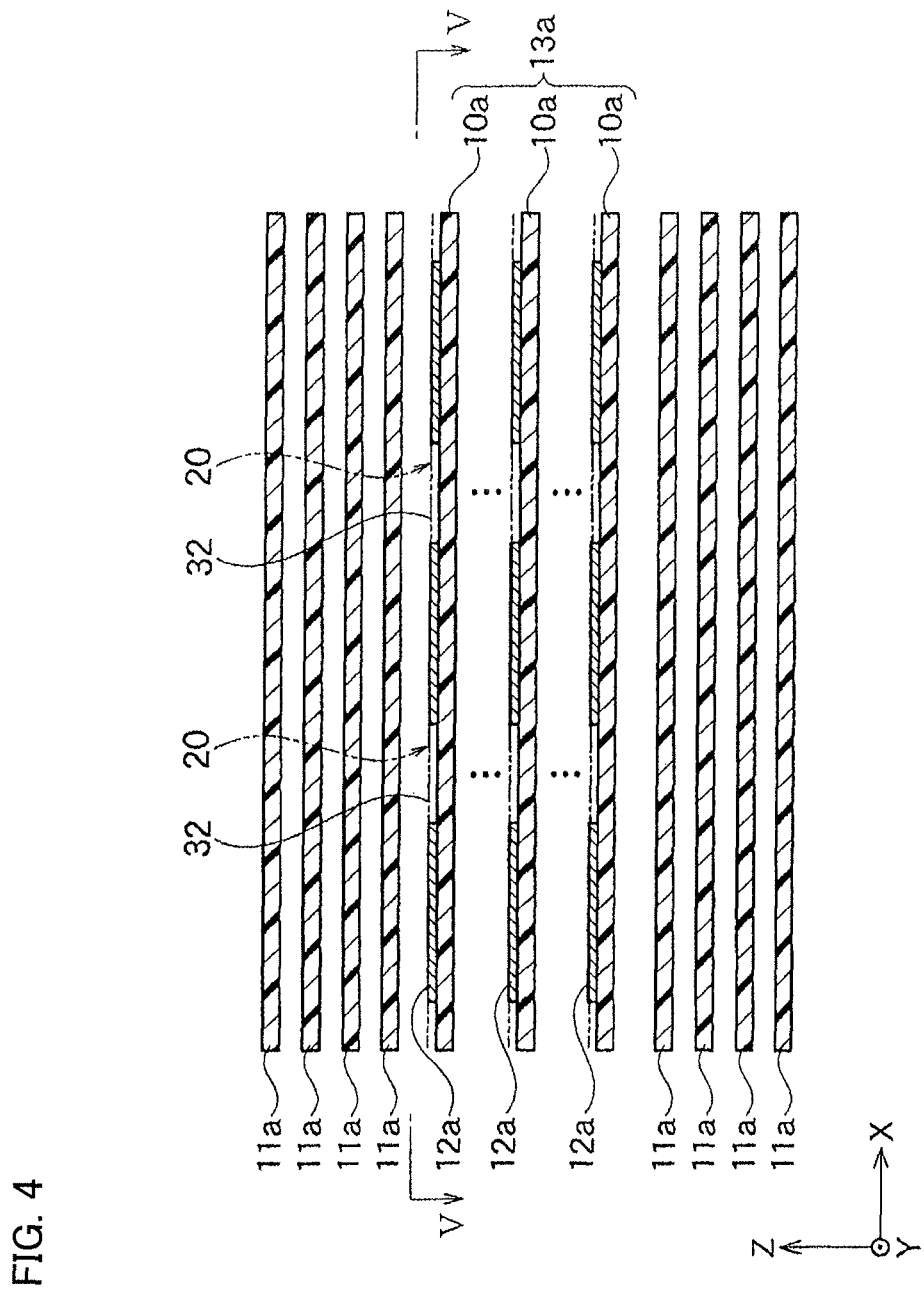
FIG. 4 is a schematic cross-sectional view illustrating the step of laminating a green sheet in the manufacturing process of a multilayer ceramic capacitor illustrated in FIG. 1.

Next, as illustrated in FIG. 4, the internal electrode pattern layer 12a is formed on the surface of the inner green sheet 10a by using the paste for internal electrode layer.

An internal laminate 13a illustrated in FIG. 4, where the internal electrode pattern layer 12a and the inner green sheet 10a are alternately laminated by a predetermined number, is manufactured by laminating the inner green sheets 10a where the internal electrode pattern layers 12a by a predetermined number.

After the internal laminate 13a is manufactured, the outer green sheet 11a is formed thereon by using the paste for outer green sheet, and the resultant is pressurized in the laminating direction to obtain a green laminate.

As a method for manufacturing the green laminate, in addition to the above, a green laminate may be obtained by alternately laminating a predetermined number of the inner green sheet 10a and the internal electrode pattern layer 12a directly on the outer green sheet 11a and pressurizing the resultant in the laminating direction.

Figure 5A:
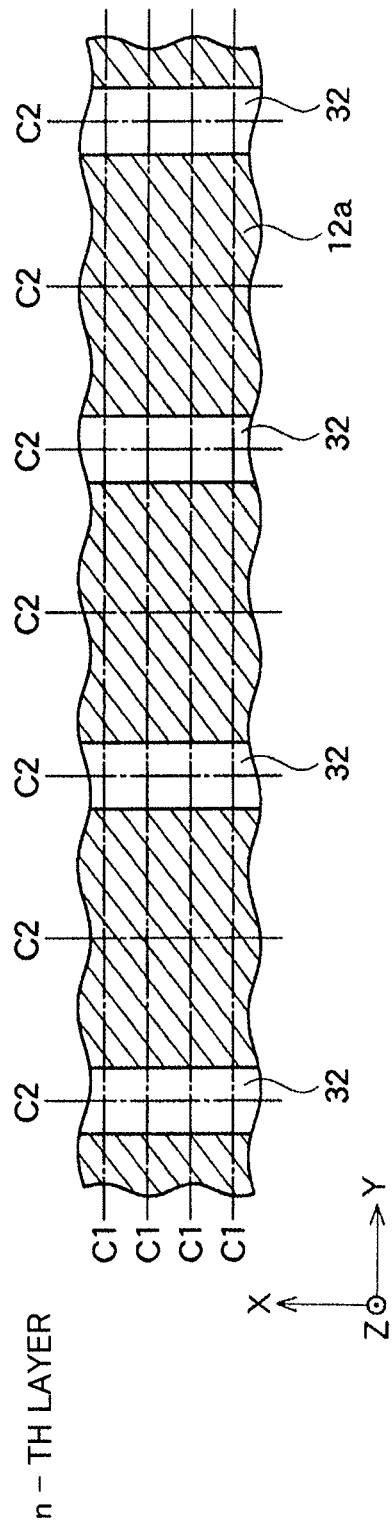
FIG. 5Aa is a plan view illustrating a portion of the n-th internal electrode pattern layer taken along the line V-V illustrated in FIG. 4.
Figure 5A:
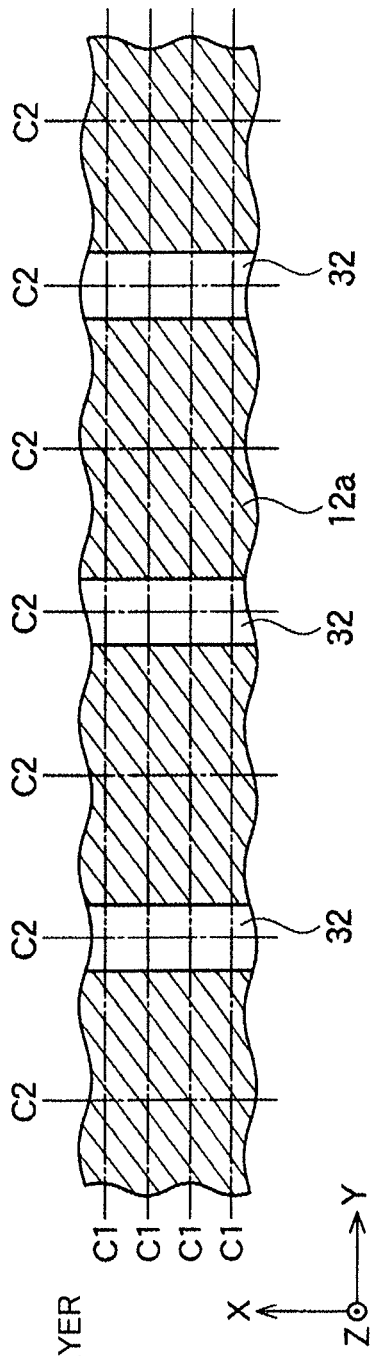

Incidentally, when manufacturing the internal laminate 13a, as illustrated in FIG. 5Aa, a gap 32 of the internal electrode pattern layer 12a is formed in the Y-axis direction and a continuous flat internal electrode pattern layer 12a is formed in the X-axis direction at the n-th layer.

Next, as illustrated in FIG. 5Ab, the gap 32 of the internal electrode pattern layer 12a is formed in the Y-axis direction and a continuous flat internal electrode pattern layer 12a is formed in the X-axis direction at the (n+1)-th layer as well.

At this time, the gaps 32 of the n-th layer and the (n+1)-th layer of the internal electrode pattern layer 12a are formed so as not to overlap each other in the Z axis direction of the laminating direction.

In this manner, the internal laminate 13a is manufactured by laminating a plurality of the inner green sheet 10a having the internal electrode pattern layer 12a, and a green laminate is obtained by the above-mentioned method.

Figure 6A:
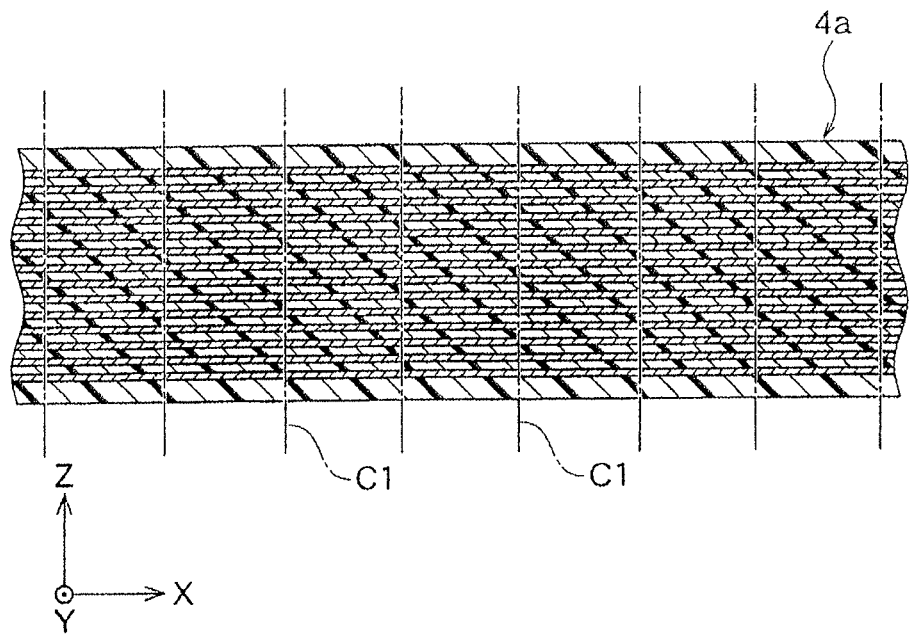
FIG. 6A is a schematic cross-sectional view of the laminate after lamination of the green sheet illustrated in FIG. 4 parallel to the X-Z-axis plane.
Figure 6B:
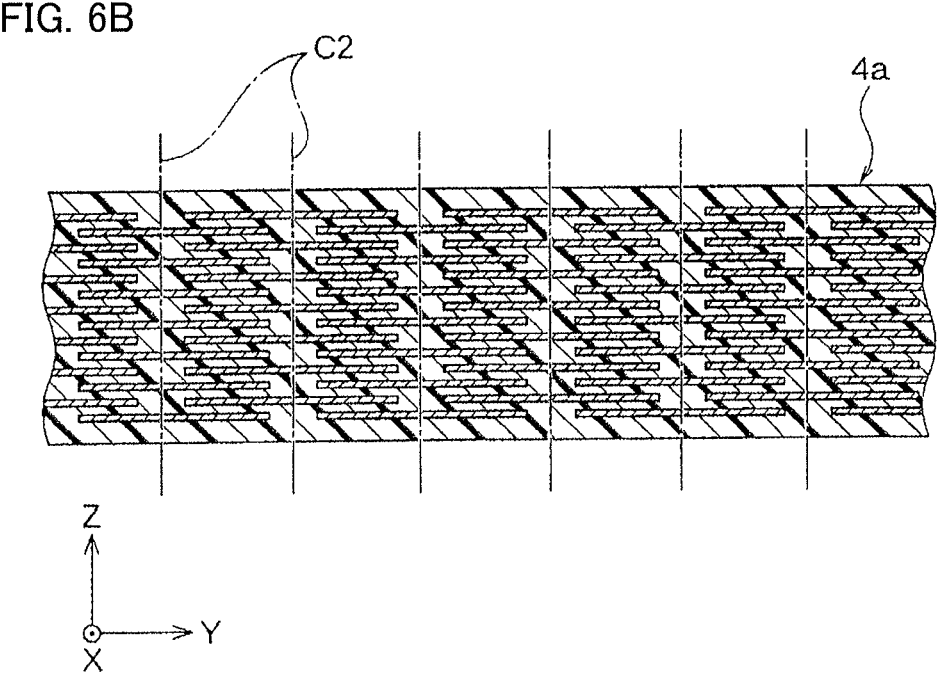
FIG. 6B is a schematic cross-sectional view of the laminate after the lamination of the green sheet illustrated in FIG. 4 parallel to the Y-Z-axis plane.

Next, the green laminate is cut along a cutting plane C1 and a cutting plane C2 in FIG. 5Aa, FIG. 5Ab, FIG. 6A, and FIG. 6B to obtain a green chip. C1 is a cutting plane parallel to the Y-Z axis plane, and C2 is a cutting plane parallel to the Z-X-axis plane.

As illustrated in FIG. 5Aa, the cutting plane C2 on the both sides of the cutting plane C2 to cut the internal electrode pattern layer 12a at the n-th layer cuts the gap 32 of the internal electrode pattern layer 12a. In addition, the cutting plane C2 which has cut the internal electrode pattern layer 12a at the n-th layer cuts the gap 32 of the internal electrode pattern layer 12a at the (n+1)-th layer.

By obtaining the green chip by such a cutting method, the n-th internal electrode pattern layer 12a of the green chip is configured to be exposed on one cutting plane and not to be exposed on the other cutting plane in the cutting plane C2 of the green chip. In addition, the (n+1)-th internal electrode pattern layer 12a of the green chip has a configuration in which the internal electrode pattern layer 12a is not exposed on the other cutting plane on which the internal electrode pattern layer 12a is exposed at the n-th layer and the internal electrode pattern layer 12a is exposed on one cutting plane on which the internal electrode pattern layer 12a is not exposed at the n-th layer on the cutting plane C2 of the green chip.

Furthermore, the internal electrode pattern layer 12a is configured to be exposed in all of the layers on the cutting plane C1 of the green chip.

Incidentally, the method for forming the internal electrode pattern layer 12a is not particularly limited, and it may be formed by a thin film forming method such as vapor deposition or sputtering other than a printing method and a transcription method.

In addition, a step absorbing layer 20 may be formed at the gap 32 of the internal electrode pattern layer 12a. The step on the surface of the green sheet 10a due to the internal electrode pattern layer 12a is eliminated by forming the step absorbing layer 20, and the step absorbing layer 20 finally contributes to the prevention of deformation of the ceramic sintered body 4 to be obtained.

The step absorbing layer 20 is formed by a printing method or the like in the same manner as the internal electrode pattern layer 12a, for example. The step absorbing layer 20 contains a ceramic powder and an organic vehicle which are the same as those in the green sheet 10a, but it is formed by a printing method unlike the green sheet 10a, and thus the ceramic powder and the organic vehicle are adjusted so as to be easily printed. Examples of the printing method may include screen printing and gravure printing.

The green chip is solidified by removing the plasticizer through solidification and drying. The green chip after the solidification and drying is introduced into the barrel container together with the media and the polishing liquid and subjected to barrel polishing by a horizontal centrifugal barrel machine or the like. The green chip after the barrel polishing is washed with water and dried. The green chip after drying is subjected to a binder removal step, a calcination step, and an annealing step to be conducted if necessary, whereby the element body 3 is obtained.

Known conditions may be set for the binder removal step, and for example, the retention temperature may be set to from 200° C. to 400° C.

In the present embodiment, the calcination step and the annealing step are conducted in a reducing atmosphere. Other calcination conditions or other annealing conditions may be known conditions, and for example, the retention temperature for calcination is from 1000° C. to 1300° C., and the retention temperature for annealing is from 500° C. to 1000° C.

The binder removal step, the calcination step, and the annealing step may be conducted continuously or independently.

After annealing, a nonconductive portion may be formed by performing insulation treatment to the end portion in the X-axis direction of the internal electrode layer 12. This further improves adhesion between the internal electrode layer 12 and the insulating layer 16, and improves mechanical strength endurable to pressure from outside by handling or so.

The conditions of the insulating treatment are preferably as follows. Temperature rising rate is 10° C. to 5000° C./hour, retention temperature is 260° C., and atmosphere is in the air.

Next, the paste for insulating layer is applied to the both end surfaces in the X-axis direction of the element body 3 mentioned above and baked to form the insulating layers 16 and obtain the ceramic sintered body 4 illustrated in FIG. 1 and FIG. 2. This insulation layer 16 not only improves insulating properties but also enhances moisture resistance.

In the case of coating the paste for insulating layer, the paste may be coated not only on the both end portions in the X-axis direction of the element body 3 but also on the both end portions in the X-axis direction of the both end surfaces in the Z-axis direction and/or on the both end portions in the X-axis direction of the both end surfaces in the Y-axis direction of the element body 3.

For example, the paste for insulating layer is obtained by kneading oxide of the predetermined elements mentioned above contained in the insulating layer 16, a binder containing ethyl cellulose as its main component, and terpineol and benzotriazole of the dispersion medium by a mixer.

The element body 3 is coated with the paste for insulating layer by any method, such as dipping, screen printing, sputtering, plating, spraying, and resonating.

The ceramic sintered body 4 is obtained by coating the paste for insulating layer on the element body 3, drying, subjecting to the binder removal treatment, and baking the paste.

Incidentally, it is preferable that the baking time of the paste for insulating layer according to the present embodiment is longer than an ordinary baking time of paste containing glass, and that the baking temperature of the paste for insulating layer according to the present embodiment is higher than an ordinary baking temperature of paste containing glass. This formed the reaction portion 18, which not only prevents growth of the internal electrode layer 12 but also improves adhesion of the end portion of the internal electrode layer 12 and the inner dielectric layer 10.

From the above point of view, the baking time of the paste for insulating layer according to the present embodiment is preferably 12 hours to 24 hours, and the baking temperature of the paste for insulating layer according to the present embodiment is preferably 500° C. to 1000° C.

Incidentally, when a glass component is contained in the paste for insulating layer, the glass component that is liquefied at the time of baking easily penetrates into the gap from the end portion of the inner dielectric layer 10 to the end portion of the internal electrode layer 12 by the capillary action. Accordingly, the gap is reliably filled with the insulating layer 16, and thus not only the insulating properties are enhanced but also the moisture resistance is favorable.

When ceramic is contained in the paste for insulating layer, the ceramic sintered body may be obtained by applying the paste for insulating layer to the green chip and performing calcination etc. with the green chip.

The both end surfaces in the Y-axis direction and/or the both end surfaces in the Z-axis direction of the ceramic sintered body 4 obtained as described above are polished, for example, by barrel polishing, sandblasting, or the like if necessary.

Next, a paste for external electrode is applied to both end surfaces in the Y-axis direction of the ceramic sintered body 4 where the insulating layer 16 is baked and is baked so as to form the external electrodes 6 and 8. The paste for external electrode may be prepared in the same manner as the paste for internal electrode layer described above.

Incidentally, when the insulation treatment is performed against the end portion of the internal electrode layer 12, the end portion of the internal electrode layer 12 exposed to both end surfaces in the Y-axis direction of the ceramic sintered body 4 with the external electrodes 6 and 8 to be formed may be also insulated. When the insulation treatment is performed, reducing treatment is thus preferably performed against both end surfaces in the Y-axis direction of the ceramic sintered body 4 before the application of the paste for external electrode or at the time of baking the paste for external electrode.

The formation of the external electrodes 6 and 8 may be conducted before the formation of the insulating layer 16 or after the formation of the insulating layer 16 or may be simultaneously conducted with the formation of the insulating layer 16, and preferably it is conducted after the formation of the insulating layer 16.

The method for forming the external electrodes 6 and 8 is not particularly limited either, and it is possible to use an appropriate method such as coating and baking of the paste for external electrode, plating, vapor deposition, or sputtering.

If necessary, a covering layer is formed on the surface of the external electrodes 6 and 8 by plating or so.

The multilayer ceramic capacitor 2 of the present embodiment thus manufactured is mounted on a printed circuit board by soldering or the like and used in various kinds of electronic devices.

In the prior art, a portion of the dielectric layer is adopted as a gap portion, and thus a blank pattern in which the internal electrode pattern layer is not formed is formed at the portion to be the gap portion after calcination of the surface of the green sheet at a predetermined interval along the X-axis direction.

In contrast, in the present embodiment, the internal electrode pattern layer is continuously formed along the X-axis direction, and the gap portion is obtained by forming an insulating layer on the element body. Hence, a blank pattern for forming the gap portion is not formed. Accordingly, a flat film of the internal electrode pattern layer is formed on the green sheet unlike the method of the prior art. Hence, the number of acquisition of the green chip per area of the green sheet can be increased as compared to the prior art.

In addition, in the present embodiment, the green laminate is cut without having to worry about the blank pattern unlike the prior art, and thus the yield of cutting is improved as compared to that in the prior art.

Furthermore, there is a problem in the prior art that the thickness of the blank pattern portion is thinner as compared to the portion at which the internal electrode pattern layer is formed when the green sheet is laminated and thus the green chip is curved in the vicinity of the cutting plane thereof when the green laminate is cut. In addition, in the prior art, a bump is formed near the blank pattern portion of the internal electrode pattern layer, and thus irregularities is caused on the internal electrode layer and it is concerned that the internal electrode or green sheet is deformed as these are laminated. In contrast, in the present embodiment, the blank pattern is not formed and the bump of the internal electrode pattern layer is also not formed.

Furthermore, in the present embodiment, the internal electrode pattern layer is a flat film, a bump of the internal electrode pattern layer is not formed, and bleeding or blurring of the internal electrode pattern layer is not caused in the vicinity of the gap portion, and thus it is possible to improve the acquisition capacity. This effect is more remarkable as the element body is smaller.

The embodiments of the present invention have been described, but the present invention is not limited to the embodiments described above in any way and may be variously modified within the scope of the present invention.

Figure 5B:
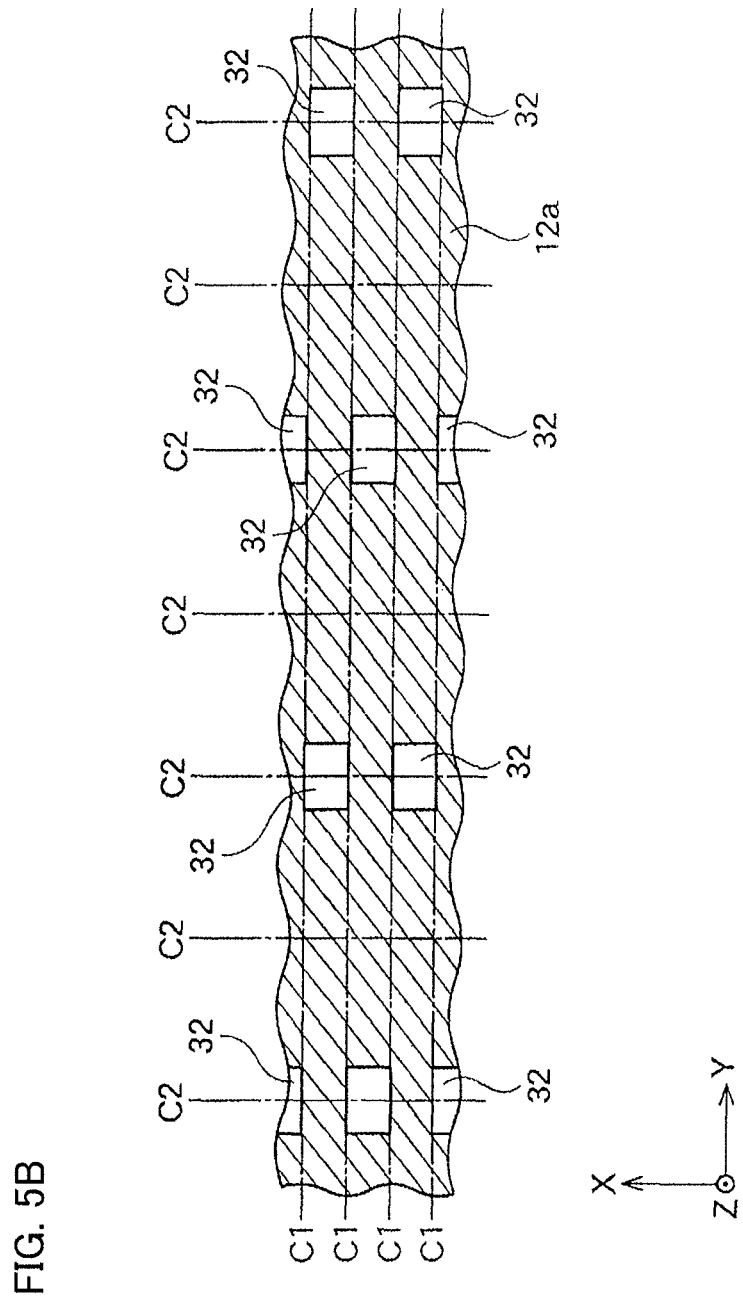
FIG. 5B is a plan view illustrating a portion of the internal electrode pattern layer taken along the line V-V illustrated in FIG. 4.

For example, the internal electrode pattern layer 12a may be a pattern having the gap 32 of the grid-like internal electrode pattern layer 12a as illustrated in FIG. 5B in addition to the pattern illustrated in FIG. 5Aa and FIG. 5Ab.

In addition, the multilayer electronic component of the present invention is not limited to a multilayer ceramic capacitor, but it can be applied to other multilayer electronic components. Other multilayer electronic components are all of the electronic parts in which the dielectric layer is laminated via an internal electrode, and examples thereof may include a bandpass filter, a chip inductor, a laminated three-terminal filter, a piezoelectric element, a chip thermistor, a chip varistor, a chip resistor, and other surface mounted (SMD) chip type electronic parts.

EXAMPLES

Hereinafter, the present invention will be described based on further detailed Examples, but the present invention is not limited to these Examples.

Example 1

The capacitor samples of sample No. 1 to sample No. 7 were fabricated as follows so as to evaluate variation of resistance value.

First, a $BaTiO_3$-based ceramic powder: 100 parts by weight, a polyvinyl butyral resin: 10 parts by weight, dioctyl phthalate (DOP) as a plasticizer: 5 parts by weight, an alcohol as a solvent: 100 parts by weight were mixed and pasted by a ball mill, thereby obtaining a paste for inner green sheet.

In addition, apart from to the above, Ni particles: 44.6 parts by weight, terpineol: 52 parts by weight, ethyl cellulose: 3 parts by weight, and benzotriazole: 0.4 parts by weight were kneaded and formed into to a slurry by a triple roll, thereby preparing a paste for internal electrode layer.

The inner green sheet was formed on a PET film by using the paste for inner green sheet prepared in the above so as to have a thickness of 7 μm after drying. Subsequently, the internal electrode pattern layer 12a was formed thereon in a predetermined pattern by using the paste for internal electrode layer, and the sheet was peeled off from the PET film. Then, the inner green sheet 10a having the internal electrode pattern layer 12a was obtained.

The internal laminate 13a illustrated in FIG. 4 was manufactured by laminating the inner green sheet 10a having the internal electrode pattern layer 12a to alternately laminate the internal electrode pattern layer 12a and the inner green sheet 10a.

Next, an appropriate number of the outer green sheets 11a was then formed above and below the internal laminate 13a by using the paste for outer green sheet, and the resultant was pressurized and bonded in the laminating direction, thereby obtaining a green laminate. The paste for outer green sheet was obtained by the same method as the paste for inner green sheet.

Next, the green laminate was cut along the cutting plane C1 and the cutting plane C2 to obtain a green chip as illustrated in FIG. 5Aa, FIG. 5Ab, FIG. 6A, and FIG. 6B.

Next, the green chip thus obtained was subjected to the binder removal treatment, the calcination, and the annealing under the following conditions, thereby obtaining the element body 3.

The condition for binder removal treatment was set so as to have a rate of temperature rise: 60° C./hour, a retention temperature: 260° C., a retention time: 8 hours, and an atmosphere: in the air.

The condition for calcination was set so as to have a rate of temperature rise: 200° C./hour, a retention temperature: from 1000° C. to 1200° C., a temperature retention time: 2 hours, a cooling speed: 200° C./hour, the atmosphere gas: a humidified $N_2+H_2$ mixed gas.

The condition for annealing was set so as to have a rate of temperature rise: 200° C./hour, a retention temperature: from 500° C. to 1000° C., a temperature retention time: 2 hours, a cooling speed: 200° C./hour, and an atmosphere gas: humidified $N_2$ gas.

Incidentally, a wetter was used for the humidification of the atmosphere gas at the time of calcination and annealing.

Next, materials for insulating layer: 44.6 parts by weight, terpineol: 52 parts by weight, ethyl cellulose: 3 parts by weight, and benzotriazole: 0.4 parts by weight, all of which were to be the amount of Bao, ZnO, $SiO_2$, and $TiO_2$ illustrated in Table 1, were kneaded and formed into to a slurry by a triple roll, thereby preparing a paste for internal electrode layer.

Incidentally, the amount of each element of the materials for insulating layer illustrated in Table 1 is represented by "%", which means "wt %".

The total of the materials for insulating layer illustrated in Table 1 is not 100 wt %, since minute components are contained therein.

Almost no elements of the materials for insulating layer contained in the paste for insulating layer mentioned above become part of the reaction portion 18, and thus the composition of the materials for insulating layer of the paste for insulating layer illustrated in Table 1 is the composition of the insulating layer 16.

The chip obtained by coating the paste for insulating layer on the entire surface of the end surface in the X-axis direction, the end portion in the X-axis direction on the end surface in the Y-axis direction, and the end portion in the X-axis direction on the end surface in the Z-axis direction of the element body 3 through dipping and drying the paste was subjected to the binder removal treatment and baking using a belt conveyor furnace to form the insulating layer 16 on the element body 3, thereby obtaining the ceramic sintered body 4. The conditions for drying of the paste for insulating layer, binder removal treatment, and baking were as follows.
  Drying
  Temperature: 180° C.
  Binder removal treatment
  Rate of temperature rise: 1000° C./hour
  Retention temperature: 500° C.
  Temperature retention time: 0.25 hour
  Atmosphere: in the air
  Baking
  Rate of temperature rise: 700° C./hour
  Retention temperature: from 1000° C.
  Temperature retention time: 12 hours
  Atmosphere: humidified $N_2$ gas The end surface in the Y-axis direction of the ceramic sintered body 4 thus obtained was polished by barrel treatment.

Next, 100 parts by weight of a mixture of spherical Cu particles having an average particle size of 0.4 μm and a flaky Cu powder, 30 parts by weight of an organic vehicle (one prepared by dissolving 5 parts by weight of an ethyl cellulose resin in 95 parts by weight of butyl carbitol), and 6 parts by weight of butyl carbitol were kneaded to obtain a pasted paste for external electrode.

The obtained paste for external electrode was transcripted on the end surface in the Y-axis direction of the ceramic sintered body 4, calcinated for 10 minutes at 850° C. in $N_2$ atmosphere to form the external electrodes 6 and 8. Then, the multilayer ceramic capacitor 2 was obtained.

The capacitor sample (multilayer ceramic capacitor 2) manufactured in this way had a size of 3.2×2.5×1.5 mm, and the inner dielectric layer 10 was 10-layered. Incidentally, the inner dielectric layer 10 had a thickness of 5.0 the internal electrode layer 12 had a thickness of about 1.2 μm, and a width Wgap of the gap portion composed of the insulating layer 16 was about 10.0 μm.

The capacitor sample and the like thus obtained was measured or evaluated by the following methods.

<Composition of Reaction Portion>

The amount of the elements contained in the reaction portion 18 was confirmed by obtaining a cross section for observation of the reaction portion 18 to observe it by a scanning electron microscope (Hitachi High-Technologies Corporation: S-4800) and analyzing the part of the reaction portion 18 by EDX (HORIBA EMAX ENERGY EX-350) with accelerating voltage of 15 kV, measurement time of 60 seconds, and ZAF method. The reaction portion 18 is reaction between the internal electrode layer 12 and the insulating layer 16, and thus spectrums appear differently from spectrums with only electrodes appeared in the internal electrode layer 12. Also, the internal electrode layer 12 and the reaction portion 18 are respectively observed as a bright part and a dark part by observation with anti-electron image, and thus differences thereof are clear. The result is shown in Table 2. Incidentally, the amount of each element of the reaction portion 18 illustrated in Table 2 is represented by "%", which means "wt %".

<Variation of Resistance Value>

With respect to 100 capacitor samples, insulation resistance was measured at room temperature by a digital resistance meter (R8340 by ADVANTEST) under conditions of measured voltage of 4V and measurement time of 30 seconds. Values of an average resistivity were obtained based on an electrode area of the capacitor sample and the thickness of the inner dielectric layer 10 so as to calculate variation of the resistivity as a standard deviation, and the result was considered to be variation of the resistance value.

The result is shown in Table 2. The standard deviation within $3\sigma=2.0\times10^8\Omega$ was judged as being favorable (◯), and the standard deviation within $3\sigma=1.0\times10^8\Omega$ was judged as being more favorable (◎). A sample having more than $3\sigma=2.0\times10^8\Omega$ was judged as being defect (x).

TABLE 1

| Sample number | Amount of each element of material for insulating layer (wt %) | | | | Softening point (° C.) |
|---|---|---|---|---|---|
| | BaO | SiO$_2$ | TiO$_2$ | ZnO | |
| 1 | 15.0% | 20.0% | — | 25.0% | 489 |
| 2 | 20.0% | 30.0% | 13.0% | — | 482 |
| 3 | 15.0% | 30.0% | 10.0% | 10.0% | 502 |
| 4 | 15.0% | 30.0% | 25.0% | 3.0% | 494 |
| 5 | 25.0% | 25.0% | 3.0% | 13.0% | 483 |
| 6 | 20.0% | 15.0% | 30.0% | 6.0% | 488 |
| 7 | 30.0% | 25.0% | 5.0% | 25.0% | 496 |

TABLE 2

| Sample number | Amount of each element of reaction portion (wt %) | | | Variation of resistance value ($\times 10^8 \Omega$) |
|---|---|---|---|---|
| | Ni | Ti | Zn | |
| 1 | 30.0% | — | 20.0% | X: 3.5 |
| 2 | 30.0% | 10.0% | — | X: 2.4 |
| 3 | 25.0% | 5.0% | 5.0% | ◯: 1.8 |
| 4 | 30.0% | 19.8% | 0.1% | ◯: 1.6 |
| 5 | 25.0% | 0.1% | 9.5% | ◯: 1.7 |
| 6 | 30.0% | 25.0% | 0.5% | X: 2.4 |
| 7 | 30.0% | 0.3% | 15.0% | X: 3.7 |

According to sample No. 1 to sample No. 7, it was confirmed that variation of resistance value was favorable when the reaction portion contained Ti and Zn, the amount of Ti was less than 25.0 wt %, the amount of Zn was less than 15.0 wt % (sample No. 3 to sample No. 5), compared with when Ti or Zn was not contained in the reaction portion (sample No. 1 and sample No. 2), the amount of Ti of the reaction portion was 25.0 wt % (sample No. 6), or the amount of Zn of the reaction portion was 15.0 wt % (sample No. 7).

It is considered that sample No. 3 to sample No. 5 were able to prevent variation of resistance value because the amount of Ti and Zn of the insulating layer was appropriate and the reaction portion was constituted stably. In contrast, it is considered that sample No. 1 and sample No. 2 were not able to prevent variation of resistance value because the amount of Ti of the reaction portion was too large. It is considered that sample No. 7 was not able to prevent variation of resistance value because the amount of Zn of the reaction portion was too large.

Example 2

The capacitor samples of sample No. 8 to sample No. 16 were fabricated in the same manner as Example 1, except that the composition and the softening point of the materials for insulating layer was changed as described in Table 3, and that the retention temperature and the retention time at the time of baking the paste for insulating layer were changed as described in Table 4. Then, the composition of the reaction portion was measured, and the variation of resistance value and the insulation breakdown voltage defective rate were evaluated. The result is shown in Table 4.

Incidentally, measurement of the composition of the reaction portion and evaluation of variation of resistance value with respect to sample No. 8 to sample No. 16 were performed in the same manner as Example 1. The method for evaluating insulation breakdown voltage defective rate was as below.

<Insulation Breakdown Voltage Defective Rate>

With a measuring machine of breakdown voltage, current was continuously applied to the capacitor sample at 10 V/sec, and a voltage when a current of 10 mA flew was considered as being insulation breakdown voltage. A value obtained by dividing this voltage by the thickness of the inner dielectric layer 10 was considered as being a breakdown voltage value. A capacitor sample broken in an insulating manner at 40 V/μm or less was considered as being defect, and a defective rate of 100 capacitor samples was obtained. The result is shown in Table 4. An insulation breakdown voltage defective rate of 15% or less was considered as being favorable.

TABLE 3

| Sample number | Composition of material for insulating layer | | | | | | | | | | Softening point (° C.) |
|---|---|---|---|---|---|---|---|---|---|---|---|
| | BaO | SiO$_2$ | B$_2$O$_3$ | Bi$_2$O$_3$ | TiO$_2$ | ZnO | MgO | Al$_2$O$_3$ | La$_2$O$_3$ | CaO | |
| 8 | ◯ | ◯ | ◯ | ◯ | ◯ | ◯ | — | — | — | — | 432 |
| 9 | ◯ | ◯ | ◯ | — | ◯ | ◯ | — | — | — | — | 482 |
| 10 | ◯ | ◯ | ◯ | — | ◯ | ◯ | — | ◯ | — | ◯ | 632 |
| 11 | ◯ | ◯ | — | — | ◯ | ◯ | ◯ | — | — | ◯ | 534 |
| 12 | ◯ | ◯ | ◯ | — | ◯ | ◯ | — | ◯ | — | — | 563 |
| 13 | ◯ | ◯ | — | — | ◯ | ◯ | ◯ | — | — | — | 549 |
| 14 | ◯ | ◯ | — | — | ◯ | ◯ | ◯ | ◯ | — | — | 542 |
| 15 | ◯ | ◯ | — | — | ◯ | ◯ | — | — | ◯ | — | 491 |
| 16 | ◯ | ◯ | ◯ | — | ◯ | ◯ | — | — | — | ◯ | 448 |

TABLE 4

| Sample number | Retention temperature (° C.) | Retention time (h) | Element of reaction potion other than Zn, Ti, and Ni | Variation of resistance value ($\times 10^8 \Omega$) | Insulation breakdown voltage defective rate |
|---|---|---|---|---|---|
| 8 | 700 | 12.0 | Bi | ◯: 1.5 | X: 95% |
| 9 | 750 | 12.0 | — | ◯: 1.7 | X: 90% |
| 10 | 700 | 18.0 | Al, Ca | ◯: 1.4 | ◯: 15% |
| 11 | 800 | 18.0 | Mg, Ca | ◯: 1.3 | ◯: 12% |
| 12 | 900 | 12.0 | Al | ◯: 1.4 | ◯: 10% |
| 13 | 800 | 24.0 | Mg | ◯: 1.4 | ◯: 3% |
| 14 | 800 | 12.0 | Mg, Al | ◯: 1.4 | ◯: 9% |
| 15 | 900 | 24.0 | La | ◯: 1.5 | X: 70% |
| 16 | 850 | 24.0 | Ca | ◯: 1.8 | X: 90% |

With respect to sample No. 8 to sample No. 16, the amount of Ti of the reaction portion was 0.1 wt % to less than 20 wt %, and the amount of Zn of the reaction portion was 0.1 wt % to less than 10 wt %.

According to sample No. 8 to sample No. 16, it was confirmed that the insulation breakdown voltage defective rate was favorable when the reaction portion further contains one or more kind selected from Mg and Al, and the insulating layer contains Ti and Zn and further contains one or more kind selected from Mg and Al (sample No. 10 to sample No. 14), compared with when Mg or Al was not contained in the reaction portion, and Mg or Al was not contained in the insulating layer (sample No. 8, 9, 15, and 16).

With respect to sample No. 10 to sample No 14, the paste for insulating layer contains Ti and Zn and contains one or more kind selected from Mg and Al. It is considered that the ion radius of Ti, Zn, Mg, and Al is significantly close to the ion radius of Ni contained in the internal electrode layer, and thus an effect of facilitating reaction at the time of baking the paste for insulating layer to the element body is obtained. It is thus considered that the elements contained in the paste for insulating layer and Ni contained in the internal electrode layer are reacted strongly, and this reduces not only variation of resistance value but also the insulation breakdown voltage defective rate.

Example 3

The capacitor samples of sample No. 17 to sample No. 25 were fabricated in the same manner as Example 1, except that the composition of materials of insulating layer was changed, and that the retention temperature and the retention time at the time of baking the paste for insulating layer were changed as described in Table 5. Then, the composition of the reaction portion and W2a/W0 were measured, and the ratio of electrostatic capacity (C/C40) and the variation of resistance value were evaluated. Incidentally, the amount of $TiO_2$ and ZnO of the materials of insulating layer with respect to sample No. 17 to sample No. 25 is as shown in Table 5.

Incidentally, the measurement of the composition of the reaction portion and the evaluation of the variation of resistance value with respect to sample No. 17 to sample No. 25 were performed in the same manner as Example 1. The measurement of W2a/W0 and the method for evaluating the ratio of electrostatic capacity are as below.
<W2a/W0>

The resin embedding was conducted so that the capacitor sample stood facing down the main surface in the Z-axis direction, and the other main surface was polished along the Z-axis direction of the multilayer ceramic capacitor 2, thereby obtaining a polished cross section having the length of the Z-axis direction of the element body 3 of ½H0. Next, this polished cross section was subjected to ion milling to remove the undercut caused by polishing. A cross section for observation was obtained in this manner.

Next, the width W2 of the reaction portion 18 at the end portion in the X-axis direction of the internal electrode layer 12 illustrated in FIG. 3 was measured at 20 points per cross section of one sample. Incidentally, the width W2 was considered as being where width was largest of one point of the reaction portion 18. This operation was carried out against 10 capacitor samples. The average value W2a of the widths W2 of the reaction portions 18 at 200 points measured was obtained. Incidentally, portions where the internal electrode layer 12 was defected were not counted. Also, W2a/W0 was calculated by measuring an average size of the width W0 in the X-axis direction of the element body 3 based on the cross section of the samples mentioned above. The result is shown in Table 6.

For measuring the widths W2, a digital microscope (VHX microscope by KEYENCE CORPORATION) was used, and observation and measurement were performed by a 5000 magnification lens. The observation was performed by optical mode, and thus a clear difference appeared between the reaction portion 18 having low lightness and Ni having high lightness. Then, the boundary between the reaction portion 18 and the internal electrode layer 12 containing Ni, which is not the reaction portion 18, can be determined. Also, the boundary between the reaction portion 18 and the insulating layer 16 can be determined by the clear difference between the reaction portion 18 having low lightness and the insulating layer 16 having no lightness.
<Ratio of Electrostatic Capacity (C/C40)>

The ratio of electrostatic capacity of 100 capacitor samples was measured at temperature of 25° C. by a digital LVR meter under conditions of 1 kHz and 1.0 Vrms, and the average value thereof (C) was obtained. Electrostatic capacity of 100 conventional products whose chip size was the same as the present example and the width Wgap (side gap) of the gap portion was 40 μm was measured under the same conditions, its average value (C40) was obtained, and the ratio of electrostatic capacity (C/C40) was obtained. The result is shown in Table 6. A ratio of electrostatic capacity (C/C40) having 1.2 or more was considered as being favorable.

TABLE 5

| Sample number | Amount of each element of material for insulating layer (wt %) | | Amount of each element of reaction portion (wt %) | | Element of reaction potion other than Zn, Ti, and Ni |
|---|---|---|---|---|---|
| | $TiO_2$ | ZnO | Ti | Zn | |
| 17 | 20% | 20% | 13.1% | 8.3% | Si |
| 18 | 20% | 20% | 13.4% | 8.2% | Si |
| 19 | 20% | 20% | 13.1% | 9.1% | Si |
| 20 | 20% | 20% | 13.2% | 8.3% | Si |
| 21 | 20% | 20% | 13.5% | 8.5% | Si |
| 22 | 20% | 20% | 13.7% | 8.8% | Si |
| 23 | 20% | 20% | 13.8% | 9.4% | Si |
| 24 | 20% | 20% | 13.7% | 9.3% | Si |
| 25 | 20% | 20% | 14.0% | 9.8% | Si |

TABLE 6

| Sample number | Retention temperature (° C.) | Retention time (h) | W2a/ W0 | Ratio of electrostatic capacity (C/C40) | Variation of resistance value (×10⁸Ω) |
|---|---|---|---|---|---|
| 17 | 600 | 12.0 | 0.03% | ◯: 2.9 | ◯: 1.5 |
| 18 | 650 | 12.0 | 0.17% | ◯: 2.5 | ◯: 1.4 |
| 19 | 700 | 24.0 | 0.33% | ◯: 2.4 | ◎: 0.8 |
| 20 | 750 | 12.0 | 0.80% | ◯: 2.0 | ◎: 0.6 |
| 21 | 800 | 24.0 | 1.97% | ◯: 1.6 | ◎: 0.7 |
| 22 | 850 | 24.0 | 2.73% | ◯: 1.3 | ◎: 0.4 |
| 23 | 900 | 24.0 | 3.33% | ◯: 1.2 | ◎: 0.4 |
| 24 | 950 | 24.0 | 3.50% | X: 1.0 | ◎: 0.5 |
| 25 | 1000 | 24.0 | 4.70% | X: 0.8 | ◎: 0.5 |

According to sample No. 17 to sample No. 25, it was confirmed that when W2a/W0 was more than 0.17% to less than 3.50% (sample No. 19 to sample No. 23), the variation of resistance value was favorable compared with when W2a/W0 was 0.17% or less (sample No. 17 and 18), and the ratio of electrostatic capacity was favorable compared with when W2a/W0 was 3.50% or more (sample No. 24 and 25). With respect to sample No. 24 and sample No. 25, it is considered that the ratio of electrostatic capacity was low because the reaction portion was too thick, and the effective capacity area was thereby decreased.

INDUSTRIAL APPLICABILITY

As described above, the multilayer ceramic electronic component according to the present invention is useful as an electronic part to be used in laptop computers or smart phones which are often used to have a great capacity while being compact.

EXPLANATIONS OF LETTERS OR NUMERALS

2 . . . multilayer ceramic capacitor
3 . . . element body
4 . . . ceramic sintered body
6 . . . first external electrode
8 . . . second external electrode
10 . . . inner dielectric layer
10a . . . inner green sheet
11 . . . exterior region
11a . . . outer green sheet
12 . . . internal electrode layer
12A, 12B . . . lead portion
12a . . . internal electrode pattern layer
13 . . . interior region
13a . . . internal laminate
14 . . . capacity region
15A, 15B . . . lead region
16 . . . insulating layer
16a . . . insulating layer extension portion
18 . . . reaction portion
20 . . . step absorbing layer
32 . . . gap between internal electrode pattern layers

The invention claimed is:

1. A multilayer electronic component comprising:
an element body having an internal electrode layer and a dielectric layer, both of which are substantially parallel to a plane including a first axis direction and a second axis direction and are alternately laminated along a third axis direction, a main component of the internal electrode layer being Ni;
a pair of side surfaces facing each other in the first axis direction that are respectively equipped with an insulating layer, the insulating layer containing Ti and Zn and further containing one or more substance selected from Mg and Al;
a pair of end surfaces facing each other in the second axis direction that are respectively equipped with an external electrode electrically connected to the internal electrode layer;
an end portion of the internal electrode layer in the first axis direction that is recessed a predetermined retraction distance along the first axis direction toward an interior of the element body from an end portion of the dielectric layer; and
a reaction portion that is present between the end portion of the internal electrode layer in the first axis direction and the insulating layer, the reaction portion containing Ti and Zn, an amount of Ti of the reaction portion being 0.1 wt % to less than 20 wt %, and an amount of Zn of the reaction portion being 0.1 wt % to less than 10 wt %.

2. The multilayer electronic component according to claim 1, wherein
W2a/W0 is 0.33% to 3.33%, where
W2a denotes an average of widths along the first axis of the reaction portions in the element body, and
W0 denotes a width along the first axis of the element body.

3. A multilayer electronic component comprising:
an element body having an internal electrode layer and a dielectric layer, both of which are substantially parallel to a plane including a first axis direction and a second axis direction and are alternately laminated along a third axis direction, a main component of the internal electrode layer being Ni;
a pair of side surfaces facing each other in the first axis direction that are respectively equipped with an insulating layer, the insulating layer containing Ti and Zn and further containing one or more substance selected from Mg and Al;
a pair of end surfaces facing each other in the second axis direction that are respectively equipped with an external electrode electrically connected to the internal electrode layer;
an end portion of the internal electrode layer in the first axis direction that is recessed a predetermined retraction distance along the first axis direction toward an interior of the element body from an end portion of the dielectric layer; and
a reaction portion that is present between the end portion of the internal electrode layer in the first axis direction and the insulating layer, the reaction portion containing Ti and Zn, an amount of Ti of the reaction portion being 0.1 wt % to less than 20 wt %, an amount of Zn of the reaction portion being 0.1 wt % to less than 10 wt %, and the reaction portion further containing one or more substance selected from Mg and Al.

4. The multilayer electronic component according to claim 3, wherein
W2a/W0 is 0.33% to 3.33%, where
W2a denotes an average of widths along the first axis of the reaction portions in the element body, and
W0 denotes a width along the first axis of the element body.

* * * * *